(12) United States Patent
Hughes et al.

(10) Patent No.: US 7,112,280 B2
(45) Date of Patent: *Sep. 26, 2006

(54) GAS POROUS POLYMER FILTER AND METHODS OF USE

(75) Inventors: Douglass E. Hughes, Boulder, CO (US); Rich Buhler, Longmont, CO (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,241

(22) Filed: Aug. 12, 2002

(65) Prior Publication Data

US 2004/0168973 A1    Sep. 2, 2004

(51) Int. Cl.
*B01D 39/00* (2006.01)
*B01D 39/14* (2006.01)

(52) U.S. Cl. .................. 210/502.1; 210/500.1; 210/500.36; 210/500.27; 96/108; 55/387

(58) Field of Classification Search ............ 210/502.1, 210/282, 264, 274, 266, 500.1, 500.36, 500.27, 210/651, 660; 55/387, 273; 95/90, 143, 95/385.1, 46, 47; 96/135, 108; 156/218; 264/113; 528/396; 424/409
See application file for complete search history.

(56) References Cited

U.S. PATENT DOCUMENTS

| | | | |
|---|---|---|---|
| 3,250,397 A | 5/1966 | Moltchan | |
| 3,263,812 A | 8/1966 | Hartley | |
| 3,439,809 A | 4/1969 | McPherren | |
| 3,450,632 A | 6/1969 | Olson et al. | |
| 3,474,600 A | 10/1969 | Tobias | |
| 3,520,417 A | 7/1970 | Durr et al. | |
| 3,556,304 A | 1/1971 | Collard et al. | |
| 3,595,399 A | 7/1971 | Whittier et al. | |
| 3,616,928 A | 11/1971 | Rosenblatt | |
| 3,950,251 A | 4/1976 | Hiller | |
| 4,061,807 A * | 12/1977 | Shaler et al. | ............... 428/36.4 |
| 4,306,971 A | 12/1981 | Hankammer | |
| 4,373,887 A | 2/1983 | Hanson et al. | |

(Continued)

OTHER PUBLICATIONS

F. DeSilva, "Activated Carbon Filtration," published in *Water Quality Products Magazine*, Jan., 2000.

(Continued)

*Primary Examiner*—Ana M. Fortuna
(74) *Attorney, Agent, or Firm*—R. Thomas Payne

(57) ABSTRACT

The filtration device of the present invention relies on materials and methodologies that achieve the formation of a structural matrix that may later accommodate the addition of other adsorbent materials as opposed to merely binding adsorbent materials together through the use of compression and/or binder materials. The filter device of the present invention relies on (i) a unique method of processing to achieve maximum density of materials, (ii) a polymeric material having a distinct morphology and (iii) a very small micron diameter of the polymeric material to create uniformity. For example, in place of compression to increase density, the materials comprising the filtration device of the present invention are instead vibrated into a mold cavity. Thus, the methodology of the current invention optimizes how all of the materials comprising the filtration device fit together without compaction. The material being processed is vibrated as it is gradually poured into the mold. Once the mold cavity has been filled to a point where it will hold no more material, it is heated and then cooled. In place of an external binder, the structural material adheres to itself as it softens. This results in a tortuous path matrix of pores rather than an absolute pore barrier.

32 Claims, 5 Drawing Sheets

U.S. PATENT DOCUMENTS

| | | | |
|---|---|---|---|
| 4,374,669 A | 2/1983 | MacGregor | |
| 4,375,441 A | 3/1983 | Adams et al. | |
| 4,460,530 A | 7/1984 | Hanson et al. | |
| 4,608,213 A | 8/1986 | Kurumizawa et al. | |
| 4,664,683 A | 5/1987 | Degen et al. | |
| 4,666,600 A | 5/1987 | Hankammer | |
| 4,686,037 A | 8/1987 | Lang | |
| 4,714,550 A | 12/1987 | Malson et al. | |
| 4,727,091 A | 2/1988 | Hawrylko | |
| 4,753,728 A * | 6/1988 | VanderBilt et al. | 210/282 |
| 4,859,386 A | 8/1989 | VanderBilt et al. | |
| 4,880,843 A | 11/1989 | Stein | |
| 4,895,648 A | 1/1990 | Hankammer | |
| 4,925,880 A | 5/1990 | Stein | |
| 4,946,599 A | 8/1990 | Craig | |
| 4,957,671 A | 9/1990 | Morris | |
| 4,969,996 A | 11/1990 | Hankammer | |
| 5,008,011 A | 4/1991 | Underwood | |
| 5,017,318 A | 5/1991 | Vanderbilt et al. | |
| 5,019,311 A | 5/1991 | Koslow | |
| 5,064,534 A | 11/1991 | Busch et al. | |
| 5,078,132 A | 1/1992 | Braun et al. | |
| 5,114,570 A | 5/1992 | Nelson et al. | |
| 5,122,272 A | 6/1992 | Iana et al. | |
| 5,126,044 A | 6/1992 | Magnusson et al. | |
| 5,156,335 A | 10/1992 | Smith et al. | |
| 5,189,092 A | 2/1993 | Koslow | |
| 5,209,887 A | 5/1993 | Von Blucher et al. | |
| 5,225,078 A | 7/1993 | Polasky et al. | |
| 5,252,206 A | 10/1993 | Gonzalez | |
| 5,273,649 A | 12/1993 | Magnusson et al. | |
| 5,331,037 A | 7/1994 | Koslow | |
| 5,338,458 A * | 8/1994 | Carrubba et al. | 210/668 |
| 5,401,399 A | 3/1995 | Magnusson et al. | |
| 5,417,860 A | 5/1995 | Kay | |
| 5,431,813 A | 7/1995 | Daniels | |
| 5,505,892 A | 4/1996 | Domme | |
| 5,509,605 A | 4/1996 | Cripe | |
| 5,545,314 A | 8/1996 | Parise et al. | |
| 5,545,315 A | 8/1996 | Lonneman | |
| 5,547,481 A * | 8/1996 | Herding et al. | 55/523 |
| 5,552,057 A | 9/1996 | Hughes et al. | |
| 5,609,759 A | 3/1997 | Nohren, Jr. et al. | |
| 5,637,214 A | 6/1997 | Kahana | |
| 5,652,008 A | 7/1997 | Heiligman | |
| 5,653,878 A | 8/1997 | Reid | |
| 5,685,981 A | 11/1997 | Koslow | |
| 5,688,397 A | 11/1997 | Malmborg | |
| 5,688,588 A | 11/1997 | Cotton et al. | |
| 5,700,371 A | 12/1997 | Koslow | |
| 5,700,375 A * | 12/1997 | Hagen et al. | 210/651 |
| 5,795,471 A | 8/1998 | Naito | |
| 5,804,074 A | 9/1998 | Takiguchi et al. | |
| 5,817,263 A * | 10/1998 | Taylor | 264/113 |
| 5,840,185 A | 11/1998 | Hughes et al. | |
| 5,853,572 A * | 12/1998 | Kuennen et al. | 210/87 |
| 5,882,517 A * | 3/1999 | Chen et al. | 210/496 |
| 5,910,229 A | 6/1999 | Mozelack et al. | |
| 5,914,045 A | 6/1999 | Palmer et al. | |
| 5,919,365 A | 7/1999 | Collette | |
| 5,922,803 A | 7/1999 | Koslow et al. | |
| 5,928,512 A | 7/1999 | Hatch et al. | |
| 5,976,432 A | 11/1999 | Yang et al. | |
| 5,980,743 A | 11/1999 | Bairischer | |
| 5,997,229 A * | 12/1999 | Akers | 411/373 |
| 6,004,460 A | 12/1999 | Palmer et al. | |
| 6,013,275 A | 1/2000 | Konagaya et al. | |
| 6,030,558 A | 2/2000 | Smith et al. | |
| 6,065,635 A | 5/2000 | Sullivan | |
| 6,096,207 A | 8/2000 | Hoffman, Jr. et al. | |
| 6,099,728 A | 8/2000 | Bairischer | |
| 6,103,116 A | 8/2000 | Koslow et al. | |
| 6,136,189 A * | 10/2000 | Smith et al. | 210/266 |
| 6,142,384 A | 11/2000 | Shafik | |
| 6,153,096 A | 11/2000 | Nonren, Jr. | |
| 6,165,362 A | 12/2000 | Nohren, Jr. et al. | |
| 6,165,807 A * | 12/2000 | Lee et al. | 438/18 |
| 6,168,651 B1 | 1/2001 | Tuma et al. | |
| 6,180,909 B1 | 1/2001 | Quick et al. | |
| 6,217,763 B1 | 4/2001 | Lawrence et al. | |
| 6,267,887 B1 * | 7/2001 | Hughes et al. | 210/266 |
| 6,274,041 B1 * | 8/2001 | Williamson et al. | 210/243 |
| 6,290,848 B1 | 9/2001 | Tanner et al. | |
| 6,331,351 B1 * | 12/2001 | Waters et al. | 428/317.7 |
| 6,342,283 B1 | 1/2002 | Mozelack et al. | |
| 6,358,487 B1 * | 3/2002 | Omae et al. | 423/450 |
| 6,368,504 B1 * | 4/2002 | Kuennen et al. | 210/315 |
| 6,395,073 B1 * | 5/2002 | Dauber | 96/134 |
| 6,395,170 B1 | 5/2002 | Hughes et al. | |
| 6,441,727 B1 | 8/2002 | LeMense | |
| 6,491,741 B1 * | 12/2002 | Tuma et al. | 95/90 |
| 6,524,477 B1 | 2/2003 | Hughes | |
| 6,551,608 B1 | 4/2003 | Yao | |
| 6,569,329 B1 * | 5/2003 | Nohren, Jr. | 210/282 |
| 6,630,016 B1 * | 10/2003 | Koslow | 95/285 |
| 6,706,194 B1 * | 3/2004 | Baker et al. | 210/668 |
| 6,726,727 B1 * | 4/2004 | Scott et al. | 623/66.1 |
| 6,770,204 B1 | 8/2004 | Koslow | |
| 6,770,736 B1 * | 8/2004 | Haftka et al. | 528/396 |
| 6,822,135 B1 | 11/2004 | Soerens et al. | |
| 6,861,002 B1 | 3/2005 | Hughes | |
| 6,890,395 B1 * | 5/2005 | Simhambhatla | 156/218 |
| 6,957,743 B1 | 10/2005 | Johnston et al. | |
| 2004/0195180 A1 * | 10/2004 | Cumberland et al. | 210/660 |
| 2004/0251190 A1 * | 12/2004 | Cumberland | 210/266 |

OTHER PUBLICATIONS

Harvey L. Stein, P.E., "Ultra High Molecular Weight Polyethylene (UHMWPE)", ASMInternational, Ohio, 1999.

Aug. 10, 2005 correspondence from Kilpatrick Stockton prepared by Bruce D. Gray, 2 pages.

Aug. 22, 2005 correspondence from Kilpatrick Stockton prepared by Bruce D. Gray with attachments, 8 pages.

Correspondence from Miles B. Dearth of Ticona, "GUR particle and filtration application information," Dec. 2005, 4 pages.

Hoechst Aktiengesellschaft, "Hostalen GUR", product brochure, Jan. 1992, DE.

Celanese AG/Ticona; "GUR PE-UHMW for Specialized Applications," Aug. 2001; product brochure.

International Search Report dated Oct. 13, 2005.

* cited by examiner

GAS POROUS POLYMER FILTER AND METHODS OF USE

BACKGROUND OF THE INVENTION

1. Field of the Invention

The present invention relates to filtration devices, novel methods for the production of the same and methods of use. More specifically, the present invention relates to a methodology of vibrating and then sintering polymers having distinct morphologies to achieve a structural filtration matrix, which is also capable of accommodating various compounds for the removal, reduction or adsorption of undesirable contaminants in liquids and gases, most notably water and air.

2. Description of the State of Art

The filtration of fluids may be accomplished through a variety of technologies, the selection of which is often determined by the contaminant or contaminants that are being targeted for removal or reduction. Particulates are best removed through a process known as depth filtration. The filter collects and holds any dirt or sediment within its matrix. Dissolved organic contaminants appearing on a molecular level may be removed through adsorption or, in the case of minerals and metals, through ion exchange. Very small contaminants, including microorganisms down to submicron sizes often require some form of membrane technology in which the pores in the membrane are configured to be smaller than the target contaminant; or they can be deactivated in some manner. Contaminants in drinking water may be broken down into four groups: (i) turbidity and particulates; (ii) organic based chemicals and pesticides; (iii) inorganic matter such as dissolved heavy metals that pose a health risk such as lead; and minerals; (iv) microorganisms such as protozoan parasites, bacteria and viruses. While there is a specific technology for the treatment of each group, some filters are designed to treat several contaminant groups through a single filtering technology. Since organic contaminants have historically been the most common, activated carbon has been used to remove a wide spectrum of contaminants from liquids, most notably drinking water. For this and other reasons most prior art fluid filters are carbon based and commonly known as carbon blocks. The current invention relates to an alternative approach to removing contaminants from fluids that provides superior filtration of fluids and other improvements over prior art methodologies.

Plastics have long been used for filtering fluids. Such methods generally involve taking plastic pellets and cryogenically grinding them into a granulated and/or powdered form. This resulting material could be used as produced or it could be screened through a sieve to separate the particles into more tightly controlled mesh ranges. The plastic particles are then sintered in a mold. The process, known more specifically as porous plastics, involves taking the mold filled with the plastic material up to a temperature where the particles soften but do not melt, such that all of the particles stick to one another. The mold is then brought back to ambient temperature and the material is ejected from the mold. The finished part is at the same time solid and self-supporting while being porous to fluids. Any plastic that can be ground into a granular form can be used; and some polyethylene polymers are produced in a powder form. Finer particles create a matrix of smaller spaces between the plastic particles which are known as voids or pores. Filtering materials, including but not limited to activated carbon, may be added to enhance the filtration of a specific contaminant.

The process of blending into and holding within the matrix of the polymeric material other filtering compounds requires that the total surface area of the polymer be greater than the total surface area that the added materials take up, such that there is sufficient adhesion. When formulated accordingly, the resulting part is durable and self-supporting. Where both the polymeric material and the filtration compounds selected generally share a similar bulk density and particle size the preferred ratio by weight for most filtration applications provides that at least 50% to 60% of the filter by weight be polymeric particles. In this process there is no force, compression nor pressure applied to the materials before or during processing, such that both the polymer particles and the filtering materials remain essentially in tact (i.e. they do not lose their original shape). The fluid being filtered flows through the porous matrix where it is forced into contact with the adsorbents or other filtering materials. This filtering technique, known as tortuous path filtration differs from what is known as absolute filtration. The size of the median diameter of the pores within the porous plastic filter determine how much of any given contaminant by size will be allowed to pass through the filter matrix. These pores cannot be made to a consistent single size and generally range from large to small, with the filter being measured by its median pore diameter (MPD) as determined by a mercury poresimiter analysis. The median pore diameter may be manipulated, as stated above, to be larger or smaller by manipulating the size of the particles that comprise it. This includes both the particle sizes of the plastic granules or powders as well as any material being blended into it.

An alternative method of filter making is known as carbon block technology. Carbon blocks are molded granular activated carbon particles. The origin came from the need to improve upon the use of loose bed carbon particles that have been utilized to remove organic contaminants from water since Roman times. However, loose bed activated carbon filters lack performance in specific areas and, as a practical matter, take up too much space for many point-of-use applications. These drawbacks led to the development of the carbon block technology during the 1980s. Here, carbon particles are blended with a small amount of a thermoplastic material, known as the binder, in a general ratio of about 4 parts granular activated carbon to 1 part thermoplastic material. The material is thoroughly blended together, poured into a cylinder shaped mold and compressed so as to compact the blended material as much as possible. The material is then heated to a point where the binder either softens or melts to cause all of the carbon particles to adhere to one another. The adhesion process uses only a small amount of binder in a ratio to activated carbon granules, which is aided by the compression that is applied to the two materials during processing. Once cooled the finished part takes on the form of a solid cylinder block comprised of carbon particles, which is self-supporting while being porous to most fluids. The cylinders invariably are tube shaped such that there is a core and a wall thickness. Water is directed to flow radially from the outside diameter (OD) surface of the tube to the inside diameter (ID) and then out one end of the core.

The ability to bond carbon particles together in a fixed bed enables carbon filters to use finer carbon particles than those traditionally used in loose bed filtering methods. The use of finer particles in turn increased the amount of available surface area of the adsorbent activated carbon, while compression of the particles during processing increased the density of carbon particles. This density also contributes to increasing the absolute micron rating of the filter since voids between the carbon particles are eliminated, creating an absolute barrier to the passage of particulates. The Degen and Vanderbilt patents (U.S. Pat. Nos. 4,664,683 and 4,753,728, respectively), both filed in 1986, teach the use of binders used in carbon block technology. Vanderbilt disclosed the use of high density polyethylene polymers in lieu of other binders, including the use of an ultra high molecular weight polyethylene (UHMW) polymer specified as GUR 212. In 1991 Koslow, in his U.S. Pat. No. 5,019,311, disclosed an alternative method of carbon block manufacture in which the adsorbent activated carbon may be blended with a combination of very low melt temperature binders and driven through an extrusion tube by an auger. The blended material is compressed as it is conveyed into the extrusion tube, then heated and quickly cooled to produce an extruded carbon block.

In the filtration of fluids, especially water and air, carbon block methodologies have certain limitations which the current invention overcomes. Carbon blocks are limited to the use of only one primary filtering material: activated carbon granules, without which there is no filter. Further limitations include the lack of depth filtration and durability. Carbon block filters exhibit a high pressure drop as a result of the compression used during processing. Fluid filters made using the current invention's methodology combined with specific polymers represent a major departure from prior art filter making methods. The current fluid filter invention may incorporate any filtering material without reliance on any single material, including very fine powders smaller than one micron. Resulting filters differentiate from prior art methods in that they exhibit superior filtration performance, excellent depth filtration, a very low pressure drop, durability, and they may be molded into any shape or dimension.

There is still a need, therefore, for a filtration device wherein the structural matrix of the filter is independent from the filtration compounds, and where the smallest particle size of the filtration compounds is unlimited, such that advantage may be taken of the greater surface area of finer powders. This in turn will allow the filtration device to be formulated to meet a specific task or tasks, while at the same time exhibiting a number of superior performance features and benefits over other filter assemblies. There is a further need for a filtration device that is durable, displays enhanced depth filtration, and exhibits minimal pressure drop.

SUMMARY OF THE INVENTION

The filtration device of the present invention relies on materials and methodologies that achieve the formation of a structural matrix that may later accommodate the addition of a wide spectrum of filtration materials. The filter of the present invention relies on (i) a unique method of processing to achieve maximum, uniform density of materials, (ii) polymeric materials having an exceptionally small particle size with a distinct morphology that is retained throughout and (iii) a polymeric matrix that forms the primary structure of the filter.

The method of processing involves the vigorous vibration of powdered filtering materials and polymer until they are firmly compacted into a given space such as a mold cavity. Pockets of air creating unnecessary voids between the particles are reduced in this manner. This achieves the maximum amount of density of materials without external force. The absence of force allows both the polymeric material and the filtering compounds to retain their original shape (morphology) and particle size. The two polymers of the preferred embodiment have distinctly different morphologies with each providing different characteristics to the resulting filter.

Thus the morphology of the two principal polymeric materials allows the filter matrix to be manipulated by adjusting the ratio between the two polymers, accentuating one attribute over another. The mean particle size of the polymers further enhances the bonding capability and density of the filter when blended with filtering compounds, because they have a greater amount of surface area than particles with similar morphologies but larger average particle sizes. Also, in this methodology a polymer particle will typically bond well to any non-polymeric material with a mean particle size ranging from very coarse and down to about one half the size of the polymer particle. Thus, a smaller polymer particle size enables a wider range of filtering materials that can be used with it. Filtering materials in the form of very fine powders exhibit greater surface area than coarser granules. In fluid filtration one common objective is to create a matrix that provides the maximum amount of available surface area of a given contaminant filtering material in the finished filter.

Unlike alternative methods involving the compression molding of common filtration adsorbents with other materials in which a small amount of a thermoplastic material binds together a much larger amount of mainly activated carbon particles, here the filtering materials are bonded onto a porous plastic matrix that is equal to or greater in overall surface area than the filtration materials being added. In place of an external binder whose sole function is limited to the adhesion of the activated carbon granules, the polymeric material in the current invention may be formulated to determine such characteristics as structural integrity, median pore diameter of the filter matrix, amount of depth filtration, density of filtering materials and pressure drop. This polymeric material in the form of a very fine powder adheres to itself during processing and will not deform when heated.

This combination of vigorous vibration of the structural materials with or without adsorbents and/or other filtering compounds produces a highly complex, labyrinthine matrix. This matrix creates a tortuous path through which the gas or liquid must flow. Tortuous path, or tortuosity, is an alternative to absolute micron filtration methodologies. Molded carbon particle filters, by comparison, are created by compressing a larger mass of coarser particles into a more densely packed matrix and bonding them together with an adhesive material such as a thermoplastic binder. The matrix of the filter is formed by the filtering material itself. There are very few pores within this matrix since they have been eliminated during the compression phase of the processing. Here the largest of these pores determines the absolute filtering capability in the removal of particulates. A tortuous path filter may be rated by the median pore diameter (MPD) within the filter's matrix. The theory of absolute micron rating is that any particle larger than the largest pore size in the filter's matrix will be rejected physically. In tortuous path filtration the particulate passes through a maze of multi-directional pores of varying pore diameters in a range that may be both larger and smaller than the particulate. Randomly, the particulate eventually becomes trapped within a pore that is smaller and is retained, while the liquid or gas being filtered easily passes on through. The chances of one particle making it through the labyrinthine matrix are small. There are many advantages to a properly developed tortuous path matrix, one of which is excellent depth filtration. Filters that rely on absolute filtration reject particulates on the exterior surface of the filter, where they accumulate and eventually clog the filter. Filters that rely on tortuosity hold particulates within the filter matrix, not its surface.

While physical contaminants may be capably removed through tortuous path filtration even where the median pore diameter is several times greater than the contaminant being retained, dissolved contaminants in gases and liquids can also be removed more effectively. This is due to the current invention's ability to utilize powdered materials that heretofore have been regarded as too fine. For example, a single gram of carbon may be activated to have a total surface area of up to 1500 m². The more finely it is ground the more of this surface area becomes available. Available surface area may be defined as that amount of material that is physically exposed to the fluid being filtered. Prior art attempts utilize fine powders has made only moderate progress and has fallen short of the achievements of the current invention, where there is no downward limitation to the particle size of the filtering materials.

Additional objects, advantages, and novel features of this invention shall be set forth in part in the description and examples that follow, and in part will become apparent to those skilled in the art upon examination of the following or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the Drawings.

DETAILED DESCRIPTION OF THE PREFERRED EMBODIMENT

Figure 1:
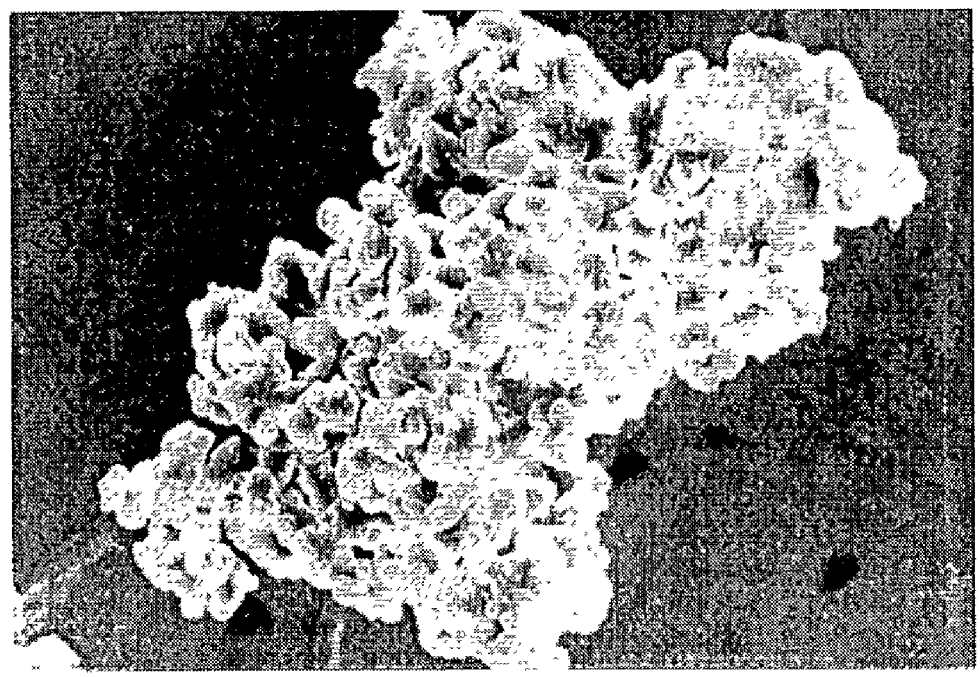
FIG. 1 is a photomicrograph demonstrating the morphology of the first base polymeric material, referred to as PMX CF-1.

The filtration device of the present invention relies on (i) a unique method of processing to achieve maximum density of materials with uniform particle distribution, (ii) a combination of polymeric materials having distinctly different morphologies to create a formed, structural filtration matrix and (iii) a polymeric material having a very small micron diameter that enhances the use of finely powdered filtering compounds. These compounds may include adsorbents, such as but not limited to granular and powdered activated carbon, metal ion exchange zeolite sorbents such as Engelhard's ATS, activated aluminas such as Selecto Scientific's Alusil, ion exchange resins, silver, zinc and halogen based antimicrobial compounds, acid gas adsorbents, arsenic reduction materials, iodinated resins, textile fibers, as well as other polyethylene polymers. The formation of a structural filtration matrix accommodates the presence of filtering compounds, which may be formulated to a specific task such as targeting one contaminant only or one group of contaminants, such as for example heavy metals; or it may be formulated to filter out a broad spectrum of contaminants from various contaminant groups. The ability to incorporate any filtering material of any particle size or any combination thereof into the polymeric matrix enables greater flexibility in formulating a filter to a given task.

The method of the present invention utilizes vibration rather than compression of the materials to be sintered. Vibration optimizes how all of the materials fill the mold completely without force or deformation of the particles. The mold receiving the material being processed is therefore vibrated as the blended material is gradually conveyed into the mold. Once the mold cavity or cavities has been vibrated to a point where it will hold no more material, it is free sintered such that it is heated to a point where all of the polymeric materials soften on the surface and stick to the surrounding particles and is then returned to ambient temperature. The base polymeric materials comprising the filter matrix of the present invention are two very fine polymer powders in the 30 to 60 mean particle size range, respectively, which become tacky at elevated temperatures yet without losing their distinct morphologies. This causes the particles to adhere permanently to one another during sintering, as well as forming a surface bond to any filtering materials that have been added. This is characteristic of very high and ultra high molecular weight polymers, of which the latter of more preferable. Once the material is cooled, the finished part, which is now self-supporting, exhibits a complex internal matrix comprised of millions of minute, interconnected, multi-directional pores of varying diameters forming a tortuous path obstacle to the through flow of contaminants in fluids. The filter may be formed using only one or both of the polymer powders, and may include any filtering material that remains stable at the processing temperature of from about 275 F to 375 F. When finely powdered filtering compounds are used, the interior surfaces of the plastic matrix pathways become coated with the finer powders of filtering material that are smaller than the polymer particles. The relatively coarser particles of filtering material fill in the pore volumes created by the minute void spaces. This combination creates even further tortuosity and reduces the median pore diameter of the filter matrix as well.

These polymers are specifically characterized, for the purpose and resulting success of the current invention, as follows: (i) they each have individual morphologies that contribute to the surface area, durability, density and tortuosity of the filter's matrix; (ii) they will soften and adhere to each other or to other materials when heated to a critical temperature; (iii) during processing they retain their respective morphologies; and (iv) their respective micron diameters are critical to the enabling of the use of the materials in the preferred embodiments. For example, PMX CF-1 (FIG. 1) has a unique morphology, much like popcorn, in which the surface is convoluted and the particle itself is perforated, and a bulk density of 0.25 to 0.30 g/cm³. This unique morphology provides a considerable increase in surface area of the particle as compared to PMX CF-2 (FIG. 2), which has a traditional, spherical shape and a bulk density of 0.40 to 0.48 g/cm³. Each particle's morphology provides a different characteristic, as does its bulk density and average particle size. For example, PMX CF-1's expanded surface area and irregular shape creates a very strong, somewhat elastic, durable part when processed according to the methodology disclosed herein. The polymer itself is vented such that fluids flow both through and around it. It easily bonds to very fine powders that are comparable to or smaller in particle size to itself; but it will also bond well to much larger particles where necessary. Where the PMX CF-1 material provides outstanding strength, the PMX CF-2 material's main attributes are greater density of materials and an elevated pressure drop. A filter made solely of PMX CF-2 and filtering materials requires a ratio of more polymer-to-filtering material, generally in a ratio of about 3:2 by weight, since PMX CF-2 has less surface area. As more material is added the resulting part becomes weaker. This weakness is a result of the polymer's spherical morphology, since spheres provide fewer points of contact for adhesion in comparison to the irregular shaped particles of PMX CF-1. In the process of developing a superior fluid filter, the two PMX materials, each with their respective particle sizes and opposing morphologies, are blended in differing ratios to one another and other filtering materials to achieve a finished filter part that acquires qualities of both polymeric materials. The method of the present invention also teaches the benefits and superiority of creating a polymeric filter matrix from the two PMX polymers, whose morphology and size enable finer, powdered adsorbent materials to be used to enhance performance. The durability and elasticity gained by using PMX CF-1, combined with the increased density created by using PMX CF-2, enable a variety of formulations to be created that accommodate a wider range of filtering compounds used in removing contaminants from liquids and gases. The ones selected for the preferred embodiment are PMX CF-1 and PMX CF-2, manufactured by Ticona, a division of Celanese, located at 90 Morris Avenue, Summit, N.J. 07901, USA. However, polymers available from other manufacturers of very high and ultra high molecular weight polymers that are comparable in particle size, bulk density, morphology and a molecular weight of from about 750,000 to 3,000,000 may also be used.

Figure 2:
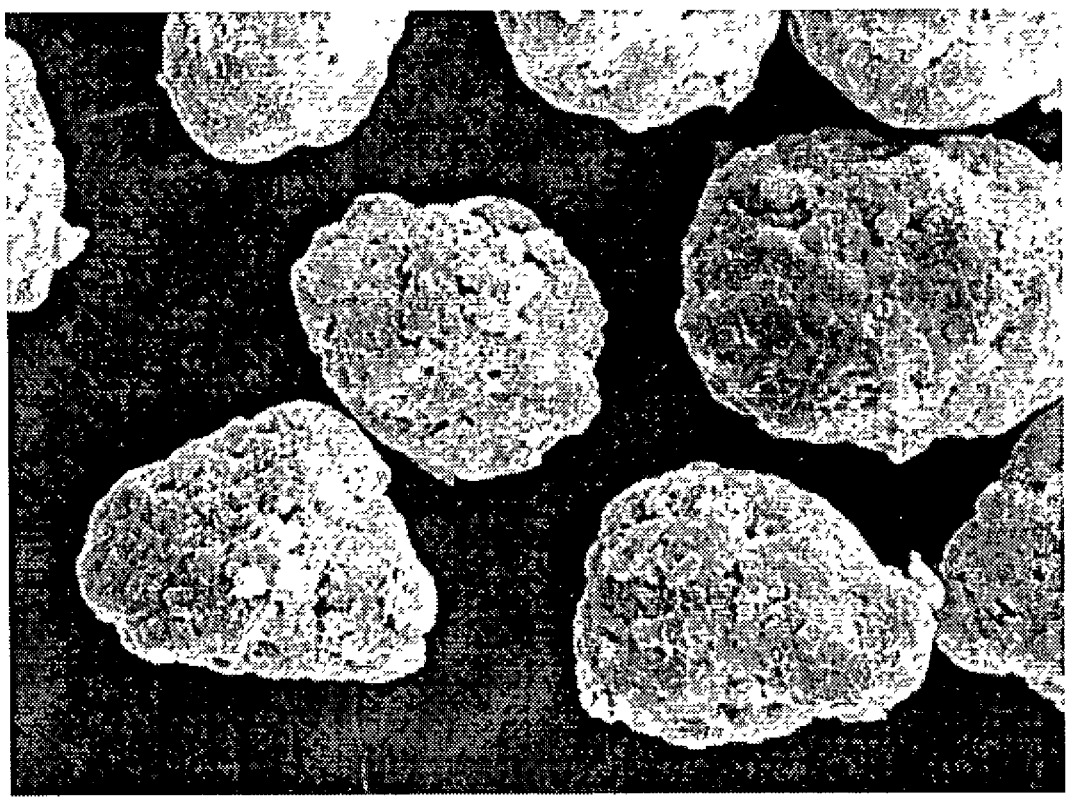
FIG. 2 is a photomicrograph demonstrating the morphology of the second polymeric material, referred to as PMX CF-2.
Figure 3:
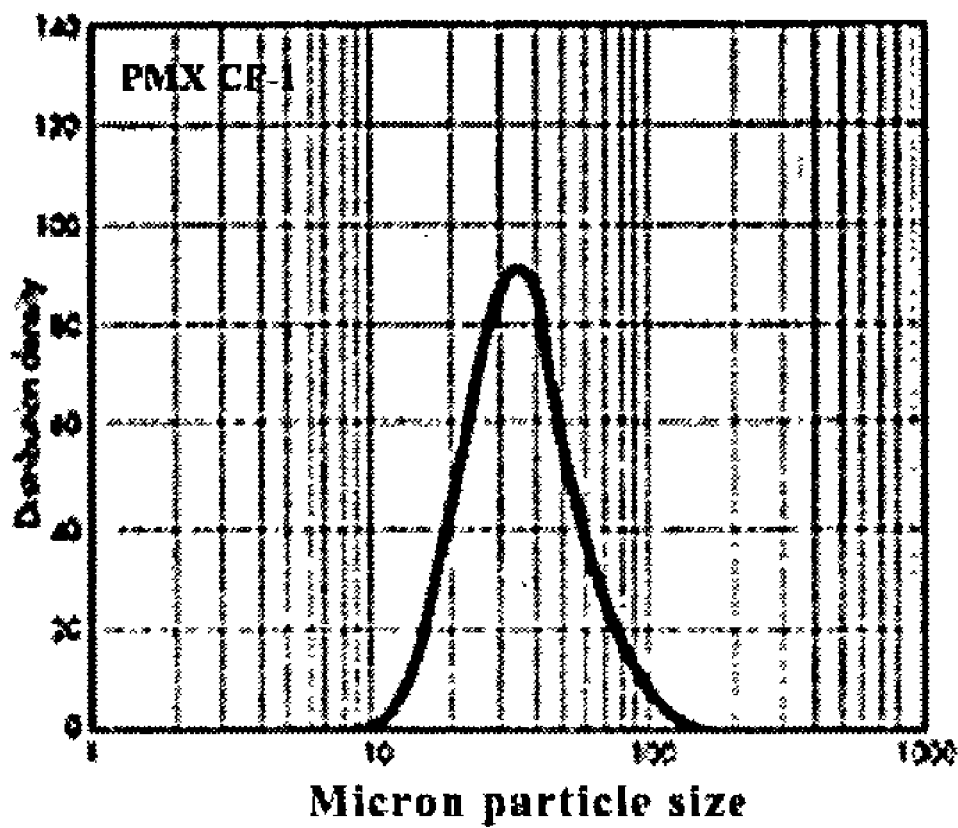
FIG. 3 is a graph of the particle distribution of the base material shown in FIG. 1 demonstrating that the average micron diameter is approximately 37 microns.
Figure 4:
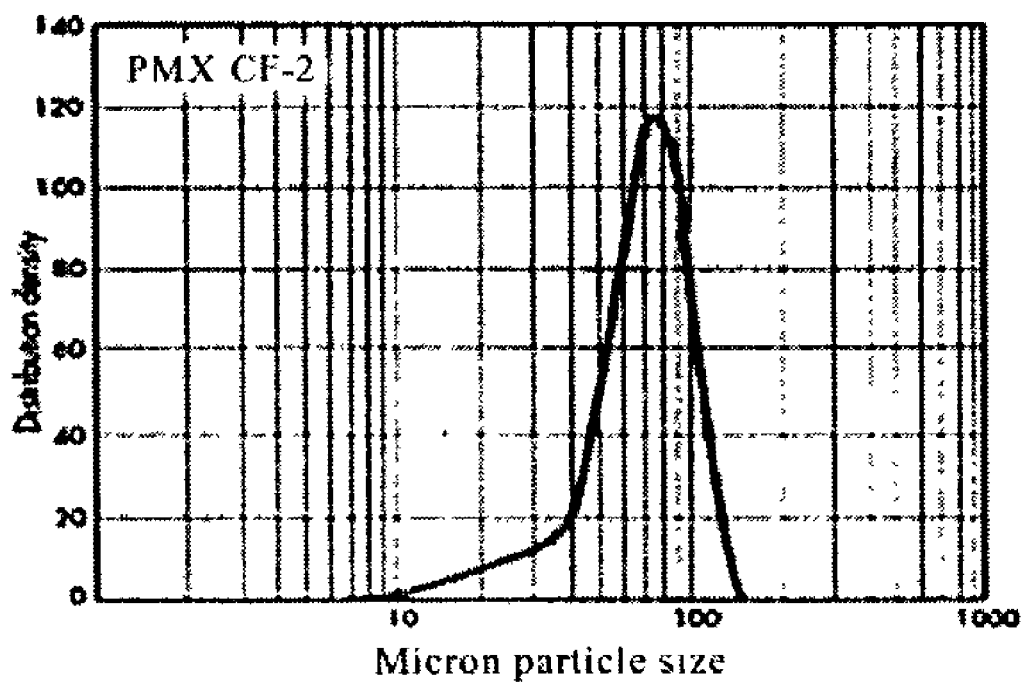
FIG. 4 is a graph of the particle distribution of the material shown in FIG. 2 demonstrating that the average micron diameter is approximately 60 microns.
Figure 5:
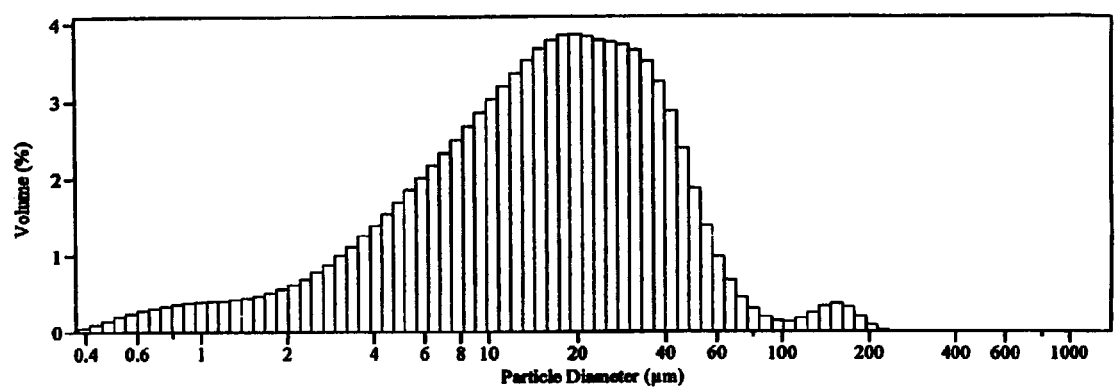
FIG. 5 is a graph of a laser particle analysis of the particle distribution density of filtering adsorbent material used in one of the preferred embodiments of the present invention.

While the two polymers have the same melt flow characteristics, the two PMX polymer particles differ from each other in morphology, bulk density and average micron size. The morphologies have been shown in FIGS. 1 and 2, while the particle size distributions are shown in FIGS. 3 and 4. In FIG. 3, PMX CF-1 is shown to have an average micron diameter of about 30 to 40 microns, with a total range from 10 microns to 100 microns. In FIG. 4, PMX CF-2 is shown to have an average micron diameter of 55 to 65 microns, with a particle distribution range from 10 to 180 microns. However, the PMX CF-2 powder may be screened through a sieve so that its average micron diameter is adjusted down to about 30 to 40 microns. Alternatively, instead of sieving the material, any commercially available polymer of similar characteristics with the desired micron size and morphology would suffice. The morphology is significant since PMX CF-1 exhibits a greater amount of surface area, a very small micron diameter and an irregular shape. The unusually small micron size combined with the particle's unique shape as shown in FIG. 1 allow the polymer particle to bond more thoroughly to other particles during processing since there are more contact points than a typical spherical shaped polymer particle, such as the PMX CF-2, as shown in FIG. 2 material. The expanded surface area enables the particle to accommodate more finely powdered filtering compounds that bond to it during processing. Finally, the small micron size adapts more easily to other materials of any particle size or distribution range, but especially well to particles of a similar size or smaller. Smaller particles become trapped within the irregular surface of the PMX CF-1 polymer particle itself without decreasing its ability to adhere to other adsorbent materials during processing. This characteristic is specific to only PMX CF-1. This is advantageous since, as a rule, the finer an adsorbent material is powdered the better it will perform in filtration since more of its surface area is exposed to passing contaminants. One characteristic of the PMX CF-1 polymer is that when it is blended with granular or powdered additives such as the aforementioned compounds and/or adsorbents, it is very durable with lesser density and the highest amount of depth filtration capability. Depth filtration is the ability to trap and hold suspended particulates from a fluid stream. As PMX CF-2 is formulated into the material, the parts gain density with greater part weight, while the pressure drop increases slightly. The increased pressure drop does not actually denote a smaller median pore size; rather, it results from the replacement of the CF-1 material, which is itself porous to fluids, by the CF-2 polymer, whose spherical shape is non-porous. As fluids flow through the filter matrix the CF-2 material has reduced the total pore volume within the matrix. By balancing these opposing qualities of the two polymers a filter may be formulated to achieve very specific goals. For example, where a fluid contains both particulates and contaminated with dissolved organics such as for example, an unacceptable level of pesticidal residue, the objective may be depth filtration in conjunction with an adsorbent such as activated carbon. Here the solution might be a filter comprising about 50% PMX CF-1 and 50% finely powdered activated carbon particles such as those shown in FIG. 5, or a more coarse, granular activated carbon particle size ranging from about 45 to 180 microns. The filter may be made to have greater density by replacing some of the CF-1 with CF-2. In this case the over all filter weight increases. The actual ratio between the two polymers would subsequently be determined by the desired flow rate of the fluid being filtered and the actual geometry of the filter part when molded. However, once a formula has been established the process may be repeated continuously with predictable filter performance so long as the added filtering materials remain within certain tolerances such as mean particle size, particle distribution density, bulk density and moisture content. The most important of these is mean particle size and distribution density, which may quickly be determined before processing through a laser particle analysis such as the one shown in FIG. 5.

An important factor in the performance of any compound or adsorbent such as activated carbon to filter dissolved contaminants from a through flow of a gas or liquid is (i) how much of the original surface area of the compound or adsorbent material has been retained (not lost) during processing, and (ii) how to maximize the amount of available surface area that is directly exposed to the contaminated fluid stream. Prior art methods of fluid filtration have been based on methodologies and materials that blind off portions of the total available surface area of a filtering compound. Blinding simply means that an exchange site on the surface of a filtering material such as an adsorbent or an ion exchange material is interrupted by a particle of binder such that it does not come into contact with the fluid stream. Where compression is used the filtering materials are forcibly imbedded into the binding material under heat and pressure. Such binders deform under pressure, lose their morphology and blind off a portion of the filtering material. Very low melt temperature binders simply liquefy and absorb very fine powders and blind larger particles, reducing the amount of available surface area. In the method of the current invention very fine powders bond to the massive surface created by the polymeric structural filtration matrix. Where exceptional filtration of dissolved organics and metals in a liquid such as water is desirable, the use of such finely pulverized filtering compounds is an important achievement because they exhibit more available surface area, which in turn increases the contact time between the filtering material and the contaminant.

The novelty of the filter of the present invention relies upon the formulation, interrelationship and use of the two polymers as depicted in FIG. 1 and in FIG. 2 when processed using the aforementioned vibration/sintering method. When eliminate chlorine in drinking water in a process known as reduction. Other filtering materials work on the principle of ion exchange. For example, heavy metals such as lead may be removed from drinking water using a metal ion exchange zeolite sorbents or activated aluminas. Yet other filtering materials include antimicrobials. These are typically silver or halogen based products that discourage the growth of bacteria and other microorganisms. Filtering compounds that are commonly used in filtering gases and liquids are available in powder form and a partial listing of filtering compounds that may be used in the present invention are listed below in Table I.

TABLE I

| MATERIALS | FUNCTION | SUPPLIERS |
| --- | --- | --- |
| ACTIVATED CARBON | ORGANICS REMOVAL/DESICCANT | BARNEBY SUTCLIFF |
| ACTIVATED CARBON | ORGANICS REMOVAL/DESICCANT | CARBON RESOURCES |
| ATS (METAL ION EXCHANGER) | HEAVY METALS REDUCTION | ENGELHARD MINERALS |
| ALUSIL (ACTIVATED ALUMINA | LEAD REDUCTION | SELECTO SCIENTIFIC |
| KDF | HEAVY METAL REMOVAL | KDF FLUID TREATMENT, INC., |
| AQUABIND | ARSENIC REMOVAL | APYRON TECHNOLOGIES |
| AGION (SILVER ZEOLITE) | ANTIBACTERIAL | AGION TECHNOLOGIES |
| IODINATED RESINS | BACTERICIDE | PENTAPURE, INC. |
| FLOCK | PARTICULATE REMOVAL | CLAREMONT FLOCK |
| POTASSIUM CARBONATE | ACID GAS ADSORPTION | IONEX C CHEM |
| CALCIUM CARBONATE | ACID GAS ADSORPTION | IONEX C CHEM |
| POTASSIUM IODIDE | ACID GAS ADSORPTION | IONEX C CHEM |
| POTASSIUM HYDROXIDE | ACID GAS ADSORPTION | IONEX C CHEM |
| ION EXCHANGE RESINS | CONTAMINANT REDUCTION | SYBRON CHEMICALS |
| PMX CF-1 | FILTER MATRIX | TICONA |
| PMX CF-2 | FILTER MATRIX | TICONA | used alone each polymer creates a filter with certain characteristics that differ from each other. By combining the two polymers in a given formulation with or without the addition of filtering materials, the finished filter takes on attributes of both polymers. This novel relationship in conjunction with the process methods is capable of producing fluid filters that are superior in performance while eliminating numerous disadvantages associates with prior art filter making methods. Each of these improvements will be discussed in detail but may be summarized as follows: (1) superior adsorption of dissolved organic contaminants and/or metal ion exchange when combined with the appropriate filtering compounds; (2) ability to accommodate any filter material or combination of filtering compounds of any particle size ranging from under one micron; (3) the filters may be molded into any shape with a wall thickness down to 0.100"; (4) exceptional durability such that the finished filter will not crack, splinter or fracture on impact; (5) the pressure drop may be decreased or increased depending upon the formulation with the advantage of being capable of superior filtration without a significant loss in pressure as measured directly before and directly after the filter; (6) the filter exhibits exceptional depth filtration which enables it to continue filtering dissolved organic and inorganic contaminants without premature clogging due to the presence of particulates in the fluid stream.

Most applications in filtering fluids require the use of specific filtering compounds. The most common is activated carbon. Known as an adsorbent, activated carbon will take up and hold on its surface dissolved organic contaminants such as pesticidal residues, organic vapors, etc. It will also How the above materials may be used to create superior filtration of fluids relies on a method of processing that accomplishes two things: (1) the average particle size of the filtering material determines how much of its available surface area comes into contact with the fluid being filtered, such that the smaller the particle the greater the available surface area. For example, it has been noted that 1 gram of activated carbon is capable of having up to 1500 $m^2$ of surface area. Activated carbon is available in granular form or it may be pulverized. Using the method and materials of the current invention, particles of activated carbon with a mean particle diameter of only 22 microns may be used. What is more the chart below demonstrates that 90% of the actual particle distribution ranges from <1 micron to 45 microns. While the use of particles as small as only 22 microns on average and the ability to accept particles down to sub-micron sizes has been demonstrated, preserving the available surface area is an important attribute to this invention. Most filter making technologies in the prior art rely on density of materials. Compression is used to maximize the amount of filtering material and to compensate for what is typically only a relatively small amount of thermoplastic binder. This method requires filtering materials with larger mean particle sizes and a cut off point below which particles simply cannot be used. In the current invention the typical filter contains 50% or more polymeric material in the form of one or both of the PMX CF-1 and PMX CF-2 polymers. Because of this the total surface area for bonding is greater and the particle size of CF-1 material combined with its unique morphology creates a massively greater surface area than traditional morphologies. The CF-2 polymer's spherical morphology is unique because of its average size of only 60 microns, which gives it greater surface area.

While one of the preferred embodiments calls for a powdered activated carbon as referenced above and further evidenced by a laser particle analysis seen on Table II, there are other carbon particle distributions which are used to create different features. Where the objective is to optimize the filtration of dissolved organic based contaminants, the greater amount of available surface area found in powdered activated carbon yields superior results. However, coarser mesh carbons ranging from 45 to 180 microns render a more rounded filter, which performs very well with a more open pore structure that has greater depth filtration and only a very modest pressure drop. Also, the most common filtering materials for heavy metal removal are very fine powders which take up large amounts of surface area of the chosen polymers. To compensate for this take up and where activated carbon is also required, a particle size range of 45 to 180 microns can be preferable because the larger particles of activated carbon take up less surface area of polymer, thereby balancing the formula so that the filter adequately removes both heavy metals and dissolved organic contaminants.

TABLE II

Laser Particle Analysis of Powdered Activated Carbon in a Preferred Embodiment
Calculations from 0.375 μm to 948.3 μm

| | |
|---|---|
| Volume: | 100% |
| Mean: | 21.86 μm |
| Median: | 15.65 μm |
| D(3,2): | 6.736 μm |
| Mode: | 19.76 μm |
| S.D.: | 23.83 μm |
| C.V.: | 109% |
| Skewness: | 3.472 Right skewed |
| Kurtosis: | 17.36 Leptokurtic |

TABLE III

Particle Distribution Density from Table II

| %< | 10 | 25 | 50 | 75 | 90 |
|---|---|---|---|---|---|
| μm | 3.237 | 7.354 | 15.65 | 28.94 | 43.99 |

In still other applications some filtering materials are available only in highly coarse particle sizes. Activated carbon, for example, is readily available in micron size ranges starting at 1000 microns and lower and these may be used in combination with the PMX CF-1 and PMX CF-2 polymers to create a very open pore structure with good depth filtration and moderate reduction of organics, such as in pre-filtration applications. Non carbonaceous materials very often are not available in powder from. In such instances the PMX CF-1 and PMX CF-2 polymers will accommodate particles as large as 1000 microns. One particular instance of this is where KDF, a fluid treatment compound comprised of zinc and copper is commonly used for the removal of heavy metals and chlorine. KDF is made of relatively coarse metallic particles, which bond very well to the PMX CF-1 and PMX CF-2 polymers, with the former performing especially well due to its superior bonding capability and flow through characteristics.

While the respective morphologies of these two polymers is important in the development of a filter with unique characteristics, their micron size and particle distribution enables the filter to accommodate both granular as well as finely powdered compounds of similar or smaller median particle diameters. The objective is to create a very high performance finished filter that is durable, exhibits good depth filtration, has adequate density of materials to give it greater capacity, and an acceptable pressure drop.

The PMX CF-1 material exhibits greater surface area, superior bonding capability, and is highly durable with a relatively slight pressure drop. A filter made with PMX CF-1 provides the maximum amount of depth filtration and tortuosity when formed by itself or in conjunction with filtering materials. The PMX CF-2 material with its spherical morphology creates a denser matrix such that more material fills the same amount of space. This creates a higher pressure drop as compared to PMX CF-1. As either of the polymers is added to the other the finished part takes on attributes of both such that an ideal formula may be achieved.

A starting point in the development of a formula is generally a filter which contains about equal amounts of each polymer, which is then blended with from about 0.025% up to 55% by weight of the chosen filtering material. Certain variables control the actual formula. For example, the finer the filtering material to be added, the greater surface area of polymer will be required since finer particles cover a greater surface. The geometry of the part may be delicate or it may be strong. For example, a part with a wall thickness of 0.125" requires the strength of the polymeric material to be self supporting, while a part with a wall thickness of 0.500" becomes self supporting with less polymeric material content. Also, delicate parts favor a greater amount of PMX CF-1 due to its durability, whereas strong parts may only require a lesser amount of PMX CF-1 and can be primarily made of PMX CF-2. The added filtering material may be as small as 0.025% by weight of the total part up to 55% by weight, which will depend on the filtering objective.

The part may be comprised of only one of the two polymers, or a blend of the two in which the ratio may be any given amount of one to the other. This wide spectrum of possibilities in formulations allows the filter to be formulated to the particular characteristics of the materials. This is significant because various filtering materials available in powder form will vary in mean particle size, particle distribution density, and bulk density. To rely on only one formula would limit the full utilization of filtering materials. The use of adsorbent materials such as activated carbon with a coarser particle distribution is less efficacious in the removal of dissolved organic contaminants. Such coarser materials open up the median pore diameter and provide less surface area to be exposed to the liquid or gas flowing through the filter's matrix. Yet there are filtration applications where a coarser particle distribution may be advantageous. For example, filters whose matrices are configured in this manner exhibit a very low pressure drop and exceptional depth filtration. In such formulations the starting point may be a blend of polymers to filtering material where the polymer is PMX CF-1 by itself in a ratio of 1 part polymer to 3 or 4 parts granular activated carbon. The PMX CF-1 in this instance gives the final part sufficient strength and durability to be self supporting as a result of its greater adhesion characteristics. Here the reduced surface area of the filtering material permits a reduced amount of PMX CF-1 used to mold the part together. It should be noted, however, that such finished parts are marginally self supporting and must be reinforced with the structure of an outer container or more PMX CF-1 must be used until the right balance has been achieved. There are many applications where depth filtration and low pressure drop are important. One example would be a water filter used to filter water stored on a roof tank as in many Latin American and Asian countries. The water is physically dirty and the gravity water pressure is factored by the vertical distance between the tank and the outlet. The ideal solution in this instance is a filter which will not clog and flows easily with minimal pressure.

Apart from such applications as noted above, a perfectly uniform matrix is most desirable for even filtration; this is best achieved by maintaining uniformity in the particles sizes being processed. Where the polymer particle is itself a fine powder, and where it processes uniformly with equally fine powders, the finished filter will have a uniform filter matrix while exposing the largest amount of surface area. This explains why the unusually small particle size of the PMX polymer particles plays a key part in the invention's novelty. A larger polymer particle with a similar morphology has less surface area and processes poorly with finer powders.

The next step is the exact method of processing. Once a formula has been established to exhibit the desired characteristics in the finished filter, it must be processed in a specific manner. The materials selected are blended together so that the final material is homogeneous and free of clumps. A ribbon blender or the like is generally capable of accomplishing this. The blended material is then conveyed from the blender to a mold that may have one or more cavities in the mold. The cavity geometry will determine the final shape of the finished part. This form may be any given shape including a square or rectangular cube, a disk, a flat panel, a cup, a rod or a cylinder that is solid or a cylinder that has a core, being open at only one end or open at both ends. The material can also be formed into a continuous sheet material with a thickness down to 1 mm. The only limitation to the shape of the part is that it be able to be removed from the mold after processing.

As the basic material blend is conveyed into the mold cavity the mold is simultaneously vibrated using any standard mechanical industrial vibrator available. Commercially available vibrators will shake in an up and down motion or they will swirl the material as they vibrate, or both. The degree of vibration may be increased or decreased depending on any number of variables including the overall mass of the mold by weight, the size of the finished filter parts, as well as the aspect ratio of the parts where the length is greater than the width. Vibration should begin before the powder is conveyed into the cavity or where particles may migrate away from each other and separate in the mold, vibration may be commenced after the cavity begins to fill up with the material. In some applications, learned through experimentation, no vibration may be required. Shorter and longer vibration cycles yield differing results, which are even further differentiated by the characteristics of the cavities depth and width. The objective of vibration is two-fold: (1) to gently rid the powdered materials of air pockets causing void spaces between particles without disrupting or crushing the particles being vibrated; and (2) to maximize the amount of total powder that will compact into the mold cavity without force or compression by causing them to shift and rotate until they fit together with other particles. A shorter vibration cycle may cause less compaction while greater vibration may cause unwanted particle separation where finer particles migrate away from larger particles. This problem is of particular concern where the polymeric material is primarily spherical. Abandoning the vibration of the material prior to completely filling the mold is unadvisable since the last material added may have a different particle density; over vibration will eventually cause different material particles to migrate away from each other. There are exceptions, such as when it is not desirable to have maximum density of material, or where there is a significant difference in the particle sizes, as will be explained below.

At the end of the vibration cycle, the mold must be covered with a cover plate and is heated to a temperature such that the polymers will become sticky enough to adhere to other polymer particles or a combination of other polymer particles and filtering compounds. While PMX CF-1 and PMX CF-2, in the preferred embodiment, have a molecular weight of about 3,000,000 and will not lose their original morphology if heated beyond their softening point, lower molecular weight polymers in the 750,000 and higher range and with similar morphologies may be heated to a softening point and used as well. Where such polymers are used very tight controls on the temperature of the mold during sintering must be established to avoid deforming or melting the polymer. It is for this reason that ultra high molecular weight polyethylene polymers are preferable for their ease of processing. Once it has attained the necessary temperature, usually from about 225 degrees F. to 375 degrees F. or higher, depending on the specific melt flow index of the polymer, the mold is allowed to cool back down to ambient temperature. The cooling cycle may be natural or assisted by any form of cooling and the amount of time to cool is irrelevant to the quality of the finished part. Once the mold has been cooled the powdered materials are formed into a self-supporting porous filter. It will allow any gas or liquid to easily flow through it. If it is entirely made of polymer, it will have filter characteristics that screen out physical contaminants or it may also be used to disperse a gas into minute bubbles. It can also be formulated to remove larger parasites such as *Giardia* and other protozoans. In water filtration, for example, there are specific applications where it is desirable to remove such microorganisms without the use of activated carbons, which are known to breed bacteria.

As discussed above, the performance of the filter to remove a specific contaminant will depend on the filtering compound chosen. Activated carbon is recognized as an adsorbent of organic based contaminants ranging from dissolved organic matter to chemicals and pesticides. Certain titanium metal ion exchange zeolites such as Engelhard Mineral's ATS™ Sorbent, and activated aluminas such as Selecto Scientific's Alusil™ have been developed to remove lead and heavy metals from a liquid such as drinking water. Silver ions are known to inhibit the growth of pathogens such as *E. coli* bacteria and are available in a variety of forms that include synthetic zeolites where the sodium ions have been exchanged for silver and zinc ions. One such popular synthetic zeolite is Agion™, manufactured in Japan by Sinanen and distributed by Agion Technologies. Certain rules determine more desirable results. Most notable is the relationship between the total surface area of the polymer matrix and the amount of surface area taken up by the filtering compound that bond to the matrix during processing. A consistently durable, finished part will be formulated such that there is always greater surface area of polymer to filtering compound. Whereas in processing the relationship amongst ingredients may be proportioned by weight, relationships must be first formulated by volume of surface area with respect to each other and then converted to weight for convenience. If the total surface area of filtering compound exceeds the total surface area of the polymer(s), the part will begin to exhibit loss of structural integrity and durability. Therefore the polymer used in the preferred embodiment should always be greater in surface area by a sufficient margin.

The polymeric matrix of the filter provides physical structure, tortuosity and a surface area onto which filtering materials may be bonded. It is the supporting skeleton of the filter. If the added filtering material does not take up more polymeric surface area than is available the finished part will become self-supporting. A powdered material of any particle size may be added, or a material with a particle distribution range that includes sub-micron size particles may be successfully employed. However, a small amount of very fine powders under 5 microns will quickly coat the entire surface of the polymer matrix and will thus limit the total amount that can be used without loss of structure. In the formulation stage, particles of polymer and filtering compounds of equal size and general bulk density may as a rule are blended in equal amounts by weight where at least 10% or more of the total polymeric material is PMX CF-1. Filtering compounds that are smaller in particle size than the basic polymer material are not only accommodated by the greater surface area of PMX CF-1 because of the polymer size, but the unusual morphology takes this concept to an even higher level of performance. (See FIG. 1.) Another feature of the PMX CF-1 material is that it is vented with microscopic channels that course through the interior of the particle. This feature further enhances the flow through characteristics of the filter, including a reduced pressure drop. The unique morphology of PMX CF-1 allows very fine particles of filtering material to bond to the surface of the larger polymer particles, while filtering compounds that are equal to or larger than the polymer become trapped within the pores or void spaces of the filter matrix. In this way the non-polymeric compound is integral to the filtering but not to the structure.

Special Characteristics PMX polymers CF-1 and CF-2 with added compounds enables filters to exhibit a number of qualities that differentiate the invention from prior art. These may be summarized as follows:

Impact resistance. Since the filters are comprised of from about 50% to 100% of a basic material comprised of the PMX material formulations as described above, they are durable and resist cracking or breaking on impact. Wherever a filter must be unbreakable, such as portable applications in the wilderness or military uses, the filters may be formulated to achieve that specific goal while still achieving superior filtration.

Pressure Drop, or Delta P, is the variation in water pressure before and directly after passing through a given filter. The drop is determined by subtracting the latter from the former such that if the pressure going into the filter is 60 psi and then 50 psi coming out, the pressure drop is 10 psi; and so on. Pressure drop is unavoidable. However, a filter demonstrating the least amount of pressure drop without corresponding loss of performance is preferable. This advantage in the current invention is owing to the internal filter matrix that contains more flow through channels than a compressed filter. The greater number of channels is a result of the polymer characteristics combined with the alternative method of processing. Filters using absolute micron filtration exhibit corresponding increases in pressure drop as the diameter of the pores decreases. Therefore a superior method of filtration is through tortuosity. The number of pathways through a given filter matrix is greater than a similar filter created through the compression of particles together, especially where the compression is in the range of 30%. This was further proven out by comparing filters using PMX CF-1 with and without PMX CF-2. A filter using 100% PMX CF-1 was tested for air permeability against filters in which PMX CF-2 was blended. The first blend was 90% PMX CF-1 to 10% PMX CF-2. The pressure drop increased slightly. However, at 80% PMX CF-1 to 20% PMX CF-2 there was a distinct and measurable increase in pressure drop. This increase continued as the ratio was subsequently changed to 70% to 30% down to 60% to 40%. Since there were no other changes or variables, the change must be traced back to the polymer formulations. Thus pressure drop may be modified according to the application through the relationship between the PMX CF-1 and CF-2. The importance of particle size impacts the characteristics of the filter. Where the CF-2 material is sieved to mimic the particle size and distribution density of the CF-I material, the finished part displayed less density and a lower pressure drop.

Depth Filtration. Absolute micron rated filters have little or no depth filtration capability, especially where the absolute micron rating is in the 1 to 10 micron range. To achieve, for example, a 1 micron absolute pore diameter all pores larger have been eliminated. This in turn causes the filter to reject any particle or microorganism larger than 1 micron. In a flow through pattern these particles are rejected at the surface of the filter. Depth filtration is in fact enhanced by the tortuous path method since it does not rely on absolute pore size. Filters of the current invention exhibit a considerably larger number of pores with a median pore diameter significantly larger that the particles it is capable of filtering. Commercially, a filter with depth filtration is preferable since filters are distributed throughout the country or world with knowing what amount of suspended solids may be in the unfiltered water. Most water has fine sediment that can prematurely clog a filter by collecting on its surface. Where a filter is configured to reject particles of a given size and larger, as in absolute filtration, the surface of the filter does not permit any particle larger than x (where x=the micron rating) to enter the filter matrix. The benefit to tortuous path filtration with its accompanying depth filtration capability is that it filters within the matrix rather than on the filter's surface, thus avoiding premature clogging.

Molding capability is another valuable attribute of the invention. Here, the durability allows parts to be shaped into any form. In liquid filtration, today most methods relying on prior art are manufactured solely in the form of a cylinder shaped filter in which the liquid is directed to flow in radial direction from the outside diameter of the cylinder into the inside diameter of the cylinder, passing through a wall thickness of bound carbon particles. The cylinder shape of the parts is limiting, as well as the other limiting feature that the finished parts will splinter and crack easily. Here, the invention provides for parts that are made of a durable plastic which may be formed into any shape, even with all thickness down to about 3000 microns where adsorbent are used. The parts may be formed into disks, rods, cups, cylinders or closed end cylinders. The availability of the forms expands product development potential where the finished filtering device is not bound to a cylindrical filter shape. Cylinders that are tubes, open at both ends, may be closed at one end during processing rather than having to be closed off with an end cap. This reduces in some applications manufacturing costs and increases speed of assembly of the filter into a finished device or housing. In air filtration, most filters such as for Organic Vapor (OV) adsorption, or OV masks, are constructed of loose granular activated carbon particles in the general range of 250 microns and larger. These are packed tightly into a canister and air is drawn through them to filter out organic vapors. No prior art applications have been able to reach the demands of air filtration without using an external source of pressure because the pressure drop is too high. In a respirator such as an OV mask only one's breath is used to draw in the air through the carbon.

Still another application that relies on this special molding capability is in the adsorption of organic vapors combined with humidity regulation. Activated carbon is an excellent regulator of humidity. The higher the activity of the carbon the better it will absorb moisture from a gas such as air. High activity activated carbons such as those having a Carbon Tetrachloride Number (CTC #) of +95 are most preferable where very high performance in is a must. However, even standard carbons with a CTC number of +65 are more than adequate for most filtration applications.

Low humidity levels below a relative humidity (RH) of 40 will allow the humidity to pass over a bed of activated carbon without reduction. As the humidity increases over 40 RH, the humidity is removed from the passing air. This quality of activated carbon has been adapted and used in regulating the RH in delicate instruments. One application in particular is controlling the both organic vapors and RH inside of a computer disk drive, which is vulnerable to both. Thus one filter is capable of removing trace amounts of organic gases from incoming air, while maintaining humidity levels that are either not too high or not too low. The presence of very minute amounts of acid gases, for example, has proven to corrode the heads on computer disk drives, as has excessive humidity levels.

Higher performance: The use of finely powdered adsorbents such as activated carbon powders, zeolites, activated aluminas, antimicrobials, etc. in the current invention perform at a higher level because the filter structure optimizes the interface between the adsorbent compounds in powder form and the contaminants being filtered out of the gas or liquid. This is especially true of activated carbons, which are one of the leading materials used in filtering air and water. Powdered activated carbon with a mean particle diameter of 22 microns (see FIG. 5) is optimal because it has the greatest amount of available surface area. However, it has never before been used as a primary filtering material for fluids because in most processes it is too fine to be handled or formed. In the process plus material of the current invention, fine powders are actually preferable as they create a better finished filter matrix. In water filtration, the removal of such contaminants as MTBE, a gasoline additive used today in place of lead, as well as Volatile Organic Chemicals (VOCs) is preferable but not easily attainable with conventional filtration methods.

Economical benefits of the current invention give it a price advantage over other processing methods for making water filters. The ability to utilize fine powders without loss of surface area enables filters to be made with less material. This is usually in a range of 65% to 50% less material to achieve equal performance to filters using the prior art. To establish this feature, the following comparative test was performed: Two water filters were tested, each with the ability to reduce >99% of lead in drinking water. Filter A was taken from a commercially available source. The manufacturer determined that given the factors of flow and capacity that 18% of the filter by weight was Engelhard's ATS. The filter weighed 150 grams. Filter B was made to match the same dimensions of Length, Outside Diameter (OD) and Inside Diameter (ID). Filter B weighted 112 grams and was formulated with 10% by weight of ATS. The resulting two filters then featured 27 and 11.2 grams of ATS, respectively. Filter A contained about 2.5 times as much ATS as Filter B. In a test using NSF protocol 53 both filters removed >99% of lead at pH 8.5 and 6.5. The results of this test indicate that the process used in formulating Filter A was inefficient as compared to Filter B. ATS, at a cost of about $0.025 cents per gram, can be the single most expensive additive used in water filtration for the removal of lead and heavy metals. In the above test Filter A required $0.40 US more ATS than Filter B.

The invention is further illustrated by the following non-limited applications. All scientific and technical terms have the meanings as understood by one with ordinary skill in the art. The specific applications which follow illustrate the methods in which the filtration device of the present invention may be utilized and are not to be construed as limiting the invention in sphere or scope. The uses may be adapted to variation in order to practice uses embraced by this invention but not specifically disclosed. Further, variations of the uses in somewhat different fashion will be evident to one skilled in the art.

APPLICATIONS

The filtration of gases and liquids is used in a number of industries. The features and benefits disclosed in the present invention provide clear improvements that replace existing technologies. The applications herein are meant to exemplify the various aspects of carrying out the invention and are not intended to limit the invention in any way.

Application 1

Gravity Flow Filtering Devices: Gravity flow for liquid filtration essentially means that the only force driving a liquid through a filter is the amount of head directly over the filter. The weight of the liquid creates force. This weight may be increased by increasing the head or distance between the liquid's highest level and the filter. The head will gradually diminish as the reservoir of liquid flows out through the filter. In many applications very little head pressure on the filter can be generated in portable devices, which are the primary applications for gravity flow filtering. The amount of head is limited to about 70 mm over the filter. The solution to achieve an acceptable flow rate resides in the development of a filter which will indeed flow while still filtering out contaminants. For example, for a faster flow rate an optimum formulation was found to be 25% to 35% PMX CF-1 to about 65% to 75% activated carbon granules in the 50 to 150 micron range. The coarse granules combined with the PMX CF-1 material create an open pore matrix that flows easily with very minimum head of liquid over the filter. The actual formulation may be further modified according to the desired performance of the filter. For example, a carafe style pitcher usually has only a few inches of head over the filter and therefore must have excellent flow through characteristics with very little pressure drop. In the preferred embodiment, a coarse granular activated carbon particles in the 50 to 150 micron range is blended in a ratio of 70% carbon to 30% PMX CF-1. Factors that affect the flow rate will include the wall thickness of the filter and the total wetted surface area of the filter's exterior.

In other gravity flow devices where there may be more head over the filter, or where the flow rate need not be fast, and where the challenge is to remove more contaminants, the filter's pore diameter may be reduced through the introduction of the PMX CF-2 material while decreasing the median particle distribution size of the compounds or adsorbents, as has been described previously to increase density and reduce median pore diameter. The preferred embodiment for gravity flow devices starts in a range of from about 30% or more PMX CF-1 to 70% adsorbent/compound blend. This was shown in one experiment where a molded cup shaped filter measuring 10 cm long by 5 cm in diameter was created using 30% PMX CF-1 and 70% granular activated carbon in the 50-150 micron particle distribution range.

The process used in making a gravity flow filter may be modified where necessary to create a more open pore structure, especially where a faster flow rate is desired. After sintering the material in the mold the filter, preferably a cup-shaped filter, is removed from the mold. In one experiment using this method and formulation, the cup was filled to the brim with tap water and allowed to sit. After about 60 seconds the cup began to weep droplets of filtered water along its sides. The bottom of the cup had been made with a slightly thicker wall to discourage the liquid from merely finding the path of least resistance. Over a period 10 minutes the cup gradually wetted down as it was re-filled continuously. As the cup became fully moistened the flow rate increased to well above 200 ml per minute. Later experiments discovered that a greater amount of head above the brim of the cup increased liquid flow to 500 ml per minute.

Application 2

Computer disk drives: Anywhere a contaminant removal material is used, performance is improved using the current invention. This advantage was proven in a test for the removal of an organic vapor. A 1 gram sample of activated carbon was placed in a sealed container, where the container was filled partially with trimethlpentane (THP), 99% with the loose carbon placed in an aluminum tray that floated on the surface of the trimethlpentane. In a second container a molded cube of material consisting of activated carbon from the same batch with PMX CF-1 was used and formulated such that the same amount of activated carbon by weight was contained in the cube. The contents of both trays were weighed at the commencement of the experiment, then again after 3 hours. The increase in weight of the material in each tray would then determine the adsorption capability of both the activated carbon in loose form and in molded form. Both trays gained the exact amount of weight in every experiment, indicating that the molded form lost no adsorption ability compared to the non-molded activated granules. In another experiment, the molded cubes were tested against compressed cubes of the same dimension and general part content with respect to the activated carbon. Here the molded cubes using PMX CF-1 were found to be 200% more effective in the adsorption of trimethlpentane.

This breakthrough can be used, in one instance, in computer disk drives where activated carbon is used to control humidity and adsorb organic vapors and/or acid gases. The ability to permanently bond carbon particles to the polyolefin matrix enables the filter cubes or small square, rectangular or circular tabs, or the like, to be manufactured without the shedding of carbon fines while enhancing performance by over 200%. Enhanced performance is achieved because the molded part is highly porous with very little pressure drop. Air that vents the disk drive passes through the molded carbon part instead of around it. For example, U.S. Pat. No. 6,168,651 teaches a technique of adding projections to a compressed, molded carbon part to expose more surface area to the air that is directed to flow around and not through the part, since the adsorption takes place on the surface of the part. This demonstrates the limitations of prior art, and especially the drawbacks inherent to the compression of filtering materials. Equally important in disk drives is the regulation of humidity, which activated carbon is able to provide. For example, where the humidity is less than 40 RH, the activated carbon has no effect on the humidity. However, as the RH increases above 40 the activated carbon begins to absorb the humidity from the passing air stream, thereby protecting the disk drive from an excess amount of humidity, while at the same time allowing for an optimal amount of humidity to pass through. The higher the activity of the carbon, rated by its CTC number, the more moisture it is able to absorb such that the difference between a CTC number of +65 and +95 can be double in terms of humidity regulation. The use of PMX CF-1 and or a blend of PMX CF-1 and PMX CF-2 with activated carbon allow air to flow directly through the filter matrix rather than around it. This exposes the air stream to all of the carbon, not just the carbon on the surface of the part. Since the trend in computers is hand held devices the emphasis for filters is to make them as small as possible. Thus, a 200% increase in performance will require a filter only one half the size of a compressed carbon part with binders.

In disk drives, the molded carbon part is positioned between an intake opening, usually a small pin hole, and a PTFE membrane that is used to prevent particulates from entering the disk drive. In the prior art, the incoming air is drawn over and around the carbon part so as to be exposed to its outer surface. In the current invention, the flow through capability of the carbon part may be formulated so that the incoming air will flow through rather than around the carbon part. This increases the available surface area of the carbon to the humidity and undesirable gases in the air used to ventilate the disk drive. Acid gases, for example, will corrode the head of a disk drive and cause it to fail. Too little as well as any excess humidity also can have an adverse affect on disk drives.

Application 3

Refrigeration: Household refrigerators that dispense chilled drinking water and ice use activated carbon water filters to improve the taste, odor and color of tap water. Installed at the point of manufacture, the filters have in the past typically been of a loose bed activated carbon, since carbon blocks can clog prematurely due to their lack of depth filtration. Increased filtering, such as the removal of Cryptosporidium from tap water, requires a carbon block or its equivalent which will physically screen out protozoan parasites. The problem is that the filter must last a minimum of 6 months to a year without clogging. Where filters are used in other applications, the gradual loss of flow rate indicates the filter is clogged. In refrigerators, no such warning is available. Thus, it would be preferable to have a filter that screens out protozoan parasites for an extended period of time without the risk of premature clogging of the filter, which would cut off the water supplying the appliance.

Durability in the filter matrix also translates into a filter that resists fracturing. One such application is where the filter is used in colder temperatures such as refrigeration. Today most filters are installed inside the refrigerator cabinet at eye level for ease of replacement and service by the consumer. This is done to encourage filter replacement on a timelier basis. One potential disadvantage is that most high performance filters such as carbon blocks are very brittle and fracture easily. In very cold temperatures where still water may tend to freeze slightly or ice up, even the slightest stress could cause the filter to fracture. Filters using the current invention, however, are able to be formulated such that they will actually flex when frozen solid. In common refrigerator filter applications, a filter in the preferred embodiment is made using about 50% by weight of PMX CF-1, because of its superior bonding capability with the remainder being of compounds and adsorbents to remove common tap water contaminants such as lead and chlorine. The use of only PMX CF-1 material instead of a combination with PMX CF-2 further creates a filter with excellent depth filtration and minimal pressure drop. Premature clogging problems are aggravated by flow rates that are very slow, which is typical in ice maker applications. There is such a slow flow rate that particulates such as dirt and sediment in the water easily collect and otherwise would obstruct the pores in a filter matrix. The filter of the present invention, when used for such appliances, is superior because it will continue to filter at high performance levels without clogging and without being effected by freezing temperatures. An ideal formulation of materials here would be, by weight, 50% PMX CF-1, 25% powdered activated carbon with a mean particle size of about 22 microns, and 25% granulated activated carbon in the 50 to 150 micron range. This formula may be modified to include a lead removal material where needed. In such an instance, the activated carbon is proportionately reduced to 40% to accommodate about 10% of a lead removal material such as Engelhard's ATS™. The resulting filter is durable, exhibits excellent depth filtration and yet has sufficient filtering material to provide consistent performance.

While the physical characteristics of the filter for refrigeration purposes have been reviewed above, an equally important improvement is the increased performance of activated carbon in low temperature filtration applications. Activated carbon's ability to adsorb chlorine is increased by higher temperature. In one test, chlorinated tap water was passed through a filter of granulated activated carbon in the form of a block matrix. A comparison was evaluated by increasing the water temperature from 70 degrees F. to 110 degrees F. Notable improvement was achieved at higher temperatures since chlorine, a gas by nature, becomes increasingly volatile as the temperature increases. The converse happens at lower temperatures, where activated carbon's ability to remove chlorine is diminished as the temperature drops. Since refrigerator filters have as a primary objective the removal of chlorine and lead from ice and drinking water dispensed from the refrigerator door that is very cold, the filter's ability to remove chlorine at reduced, colder temperatures is preferable. Filters made using the preferred embodiment of the current invention provide more available carbon surface area and therefore have increased capacity, particularly in chlorine removal which is wholly dependent on the available surface area of activated carbon. As the trend continues for filters to be installed inside the refrigerator cabinet, greater emphasis will be placed on making the filters smaller and less intrusive. The formulation of the current invention has shown to provide excellent performance, especially in the removal of chlorine and lead while using filters with only half the total mass of other filters. This feature combined with the trend to install filters inside the refrigerator cabinet instead of outside mean that the filter will preferably be as small as possible. The current invention enables a filter to be formulated to only one half the cubic dimensions of other filters while having more features and benefits. Another feature found to be advantageous in refrigeration is the ability for the filter to be molded into panels or shapes other than cylinders, which are a limitation of carbon blocks. Here the filter may be made into a flat panel which can fit into less usable space within the cabinet, rather than protrude into usable shelf space. Chlorinated tap water flows through the panel from one side to the other with the panel's thickness acting as the filter matrix.

Application 4

Organic Vapor Masks: Organic vapor masks protect the user from inhaling harmful chemical vapors from the air. The prior art involves the use of a very coarse mesh, granular activated carbon that has been impregnated with potassium hydroxide or potassium iodide to enhance the adsorption of acid gases. The carbon is densely compressed into a canister with perforations on one side for intake of air into the mask. As the air passes over the coarse granules of activated carbon the adsorption of the gases takes place. In the current invention, a porous part is molded to approximate the same size of the canister in terms of outside diameter (OD). The part is formed like a shallow cylinder that has a continuous side wall and a closed end of the same thickness of about 6 mm with a radius so that the closed end is rounded. The air flows in a radial direction through the cylinder outside closed end and side wall to the shallow core and into the mask. The formulation of the part involves using, in the preferred embodiment, a granular activated carbon with a particle distribution in the 75 to 150 micron range (60% by weight) to PMX CF-1 (40% by weight). The part is vibrated only slightly to avoid particle migration and pore size reduction. The ability to replace the loose bed carbon with a more advanced organic vapor filter in the current invention draws upon the special characteristics that include molding capability of the parts, low pressure drop, and higher performance. Where granular carbon beds for this application have particle distributions in the 500 to 2000 micron range, here the particles are much finer by comparison and offer greater surface area for adsorption.

Application 5

Air and Gas Filtration: The principles of causing the surface area of the filtering material to be greater while decreasing the pressure drop enhance the filtering performance of gases such as air. Prior art methods include the creation of flat panels where coarse particles of activated carbon are compacted into a given space; alternatively, some filters designed for air or gas bind fine carbon powders to a fibrous material. The air or gas flows across the fibers and in doing so become exposed to the filtering material, which is made of or incorporates activated carbon. In the current invention, flat panels may easily be molded into a geometrical shape that is defined by a length, a width and a thickness. The panel is self supporting and does not require any structure to contain it. Ease of flow through is achieved by providing coarse granules of filtering material such as granular activated carbon particles with PMX CF-1.

Still another application in the filtration of gases is the removal of toxic organic contaminants from cigarette smoke. Highly activated carbon particles may be bonded to PMX CF-1 and formed into a filter disk that is installed in the tar filter. As the smoke passes through the carbon-polymer matrix any toxic organic vapors are instantly taken up and held on the surface of the carbon particles.

Application 6

Water Filters: The increased demand for high performance in water filters is related directly to the continued discovery of residual chemicals, metals and microorganisms found in drinking water and the accompanying publicity. Contaminants in water may be classified into four groups: (i) suspended solids; (ii) heavy metals; (iii) organic based chemicals; such as pesticides and most chemicals; and (iv) micro-organisms. Filters made using the current invention's method of processing and formulations have demonstrated superior performance in the removal of all four classes of contaminants.

Water filters may be formulated to be durable with excellent density and having available a wide range of median pore diameters. The median pore diameters may be manipulated by changes in the particle distribution of the materials being processed as well as the polymers used to create the filter matrix. To create the highest performance filter in terms of removing the most difficult contaminants, such as VOCs (Volatile Organic Chemicals) a high flow rate filter in one embodiment may be formulated as follows: It would have 30% by weight of PMX CF-1, 20% by weight of PMX CF-2 and 50% powdered activated carbon in the range of 20 microns to 45 microns. To include the removal of heavy metals, this formula may be adjusted to include about 7% to 15% of a sorbent such as Engelhard Mineral's ATS™ zeolites. The exact formula will be determined according to the specifications. Conversely, if the filter is to be more open with a lower pressure drop the formula may be adjusted by modifying the powdered activated carbon (PAC) with a blend of medium coarse carbon in the 50 micron to 150 micron particle distribution range. The exact amount added depends on part geometry and other factors such as desired flow rate, pressure drop and depth filtration capability. Typical water filter geometry is a cylinder, usually open at both ends or open at one end only. The cylinder is about 9.5 inches long by 2.25 to 3.0 inches OD with an inner diameter (ID) of about one inch. Water flows radially from the OD to the ID and then out one of the open ends. A typical filter of this type will flow at 4 to 6 liters per minute and can be formulated to remove chlorine, pesticides, MTBE (a gasoline additive), VOCs, lindane, asbestos, heavy metals such as lead, and microorganisms such as Cryptosporidium. The exact amount is determined by the capacity and performance requirements placed on the filter. For example, very high flow filters with this geometry and dimensions may require 15% by weight of a lead removal sorbent where performance demands >99% lead reduction at 6 LPM, while at 4 LPM only 10% is needed. In some instances, to meet the minimum NSF 53 protocol only 7% may be needed.

Another feature of the present invention is the ability to remove contaminants in water through tortuosity rather than absolute micron filtration. One such difficult contaminant is E. coli bacteria. Internationally, most countries require a three to four log reduction of E. coli where the filter makes such a claim. This is accomplished in the current invention in a two step process as follows: the median pore diameter is reduced according to the formulation as stated above such that even pathogenic bacteria will become trapped inside the labyrinthine filter matrix. Since pathogenic bacteria will colonize inside a water filter the trapped microorganisms must be prevented from reproducing. This growth is called biofilm, which should be prevented. During the preparation and blending of the proposed compounds, a silver impregnate or silver ion or silver/zinc ion based antimicrobial powder is first blended into the CF-1 and CF-2 polymer. There is an electrostatic attraction that creates a temporary bond between the two compounds such that the minute antimicrobial powders, often in the micron diameter range of 0.2 microns to 5.0 microns, cling to the surface of the PMX particles. In the next step the other materials are blended. During processing, the majority of the fine antimicrobial powders have been placed where they will immediately form a permanent bond to the structure of the filter. A typical loading onto the filter by weight may be in the range of one percent up to five percent. As water passes through the filter matrix the activity of the silver, which differs depending on the particular characteristics of the chosen antimicrobial, deactivates the bacterium's ability to reproduce. Within 24 to 48 hours the bacterium dies naturally. Where an ordinary bacterium may reproduce 40 times per hour in this case there is no reproduction and therefore no biofilm. Dead bacteria decompose into organic matter which is instantly adsorbed by the activated carbon powder. There is no odor or residue. This process of eliminating pathogenic bacteria from water is unique because it does not require a biocide agent such as iodine or chlorine nor electricity to power a UV (ultraviolet light) lamp, which are two common methods of removing bacteria.

The use of this method of making a bacteria removal filter relies on the ability to properly handle very fine powders (under five microns) and retain their efficacy. Filters whose structural matrix is formed out of compressed carbon particles (i.e., carbon blocks) are unable to efficiently conserve such fine powders because a substantial portion of these minute particles become lodged in the crevices of the carbon itself such that they wash out of the filter at the first flush, having had nothing to permanently bond onto.

The filtering of suspended particles in fluids, particularly liquids, is an essentially preliminary step in filtration. Typically a pre-filter is installed first to physically cleanse the liquid of particulates so that down stream filters do not become prematurely clogged by fine sediment particles. To create a web-like matrix intended to maximize the depth filtration capabilities of the PMX CF-1, a blend of this polymeric material and a flock will capture and hold large quantities of sediment. Flock is a byproduct of textile manufacturing in which remnant threaded material is cut into very small lengths down to only a few microns. These short threads bond easily to the polymer during sintering and then act as a net to capture particulates. This may be combined with coarse activated carbon particles to pre-filter both particulates and organics, including chlorine, from water.

In the filtration of water, the present invention should not be considered limited to the examples above, but rather should be understood to encompass various filter configurations as set out in the claims. Minor modifications and equivalent techniques will be readily apparent to those skilled in the art of filter making.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

The embodiments of the invention in which an exclusive property or privilege is claimed are defined as follows:

1. A filtration system comprising, a filter comprising a plurality of polymer particles that (i) measure from about 10 microns to 100 microns in diameter with an average diameter of approximately 30 microns to 40 microns, and (ii) some having an irregular, convoluted surface having perforations therein and others having a non-porous generally sperical shape; and activated carbon impregnated with potassium iodide to enhance acid gas adsorption, wherein said polymer particles are combined with said activated carbon in a ratio of about 20% polymer particles or more to 80% activated carbon or less and said polymer particles and said activated carbon are formed into a dense matrix using vibration.

2. A filtration system comprising, a filter comprising a plurality of polymer particles that (i) measure from about 10 microns to 100 microns in diameter with an average diameter of approximately 30 microns to 40 microns, and (ii) an irregular, convoluted surface having perforations therein and others having a non-porous generally shperical shape; and activated carbon impregnated with potassium hydroxide to enhance acid gas adsorption, wherein said polymer particles are combined with said activated carbon in a ratio of about 20% polymer particles or more to 80% activated carbon or less and said polymer particles and said activated carbon are formed into a dense matrix using vibration.

3. A filtration system comprising, a filter comprising:
   (I) a plurality of first polymer particles that (i) measure from about 10 microns to 100 microns in diameter with an average diameter of approximately 30 microns to 40 microns, and (ii) have an irregular, convoluted surface having perforations therein;
   (II) a plurality of second non-porous polymer particles comprising (i) an average particle distribution range of from about 10 to 160 microns with an average particle diameter of approximately 50 to 70 microns; and (ii) a spherical morphology, wherein said first and second polymer particles are formed into a dense matrix using vibration; and
   (III) activated carbon impregnated with potassium iodide to enhance acid gas adsorption, wherein said polymer particles are combined with said activated carbon in a ratio of about 20% polymer particles or more to 80% activated carbon or less.

4. A filtration system comprising, a filter comprising:
   (I) a plurality of first polymer particles that (i) measure from about 10 microns to 100 microns in diameter with an average diameter of approximately 30 microns to 40 microns, and (ii) have an irregular, convoluted surface and perforations formed therein;
   (II) a plurality of second non-porous polymer particles comprising (i) an average particle distribution range of from about 10 to 160 microns with an average particle diameter of approximately 50 to 70 microns; and (ii) a generally spherical morphology, wherein said first and second polymer particles are formed into a dense matrix using vibration; and
   (III) activated carbon impregnated with potassium hydroxide to enhance acid gas adsorption, wherein said polymer particles are combined with said activated carbon in a ratio of about 20% polymer particles or more to 80% activated carbon or less.

5. A filtration matrix comprising:
   about 10% to about 65% by weight of a plurality of first polymer particles, wherein the particles have a convoluted structure and an average particle size of about 30 to about 40 microns, the first polymer particles being perforated, the plurality of first polymer particles comprising polyethylene having a molecular weight greater than about 750,000;
   about 0.5% to about 65% by weight of a plurality of second non-porous polymer particles having a generally spherical structure and an average particle size of about 30 to about 65 microns; and
   about 30% to about 75% by weight of a filtering material wherein, the first polymer particles, the second polymer particles and the filtering material are processed such that a structural matrix is formed thereby.

6. The filtration matrix of claim 5 wherein the first polymer particles, the second polymer particles and the filter material are blended.

7. The filtration matrix of claim 6 wherein the first polymer particles, the second polymer particles and the filter material are vibrated.

8. The filtration matrix of claim 6 wherein the first polymer particles, the second polymer particles and the filter material are sintered.

9. The filtration matrix of claim 6 wherein the first polymer particles, the second polymer particles and the filter material are vibrated and sintered.

10. The filtration matrix of claim 5 wherein the second polymer particles comprise:
    polyethylene.

11. The filtration matrix of claim 5 wherein the second polymer particles comprise:
    polyethylene having a molecular weight greater than about 750,000.

12. The filtration matrix of claim 5 wherein the first polymer particles comprise:
    polyethylene having a molecular weight of about 3,000,000.

13. The filtration matrix of claim 5 wherein the second polymer particles comprise:
    polyethylene having a molecular weight of about 3,000,000.

14. The filtration matrix of claim 5 wherein the first polymer particles and the second polymer particles comprise:
    polyethylene having a molecular weight of about 3,000,000.

15. The filtration matrix of claim 5 wherein the filtering material comprises:
    activated carbon.

16. The filtration matrix of claim 5 wherein the filtering material is selected from the group comprising:
    activated carbon, heavy metal reduction media, arsenic removal media, antimicrobial media, ion exchange media, iodinated resin, fiber, acid gas adsorption media and particulate removal media.

17. The filtration matrix of claim 5 wherein the filtering material comprises:
    activated carbon having an average particle size of about 20 to about 180 microns.

18. The filtration matrix of claim 5 wherein the filtering material comprises:
    activated carbon wherein about 90% of the actual particle distribution ranges from less than 1 micron to about 45 microns.

19. A filtration matrix comprising:
    about 10% to about 65% by weight of a plurality of first polymer particles, wherein the particles have a convoluted structure and a particle distribution range between about 10 and about 100 microns, the first polymer particles being perforated, the plurality of first polymer particles comprising polyethylene having a molecular weight greater than about 750,000;

about 0.5% to about 65% by weight of a plurality of second non-porous polymer particles having a generally spherical structure and a particle distribution range between about 10 and about 180 micron; and about 30% to about 75% by weight of a filtering material wherein, the first polymer particles, the second polymer particles and the filtering material are processed such that a structural matrix is formed thereby.

20. The filtration matrix of claim 19 wherein the first polymer particles, the second polymer particles and the filter material are blended.

21. The filtration matrix of claim 20 wherein the first polymer particles, the second polymer particles and the filter material are vibrated.

22. The filtration matrix of claim 20 wherein the first polymer particles, the second polymer particles and the filter material are sintered.

23. The filtration matrix of claim 20 wherein the first polymer particles, the second polymer particles and the filter material are vibrated and sintered.

24. The filtration matrix of claim 19 wherein the second polymer particles comprise polyethylene.

25. The filtration matrix of claim 19 wherein the second polymer particles comprise:
polyethylene having a molecular weight greater than about 750,000.

26. The filtration matrix of claim 19 wherein the first polymer particles comprise:
polyethylene having a molecular weight of about 3,000,000.

27. The filtration matrix of claim 19 wherein the second polymer particles comprise:
polyethylene having a molecular weight of about 3,000,000.

28. The filtration matrix of claim 19 wherein the first polymer particles and the second polymer particles comprise:
polyethylene having a molecular weight of about 3,000,000.

29. The filtration matrix of claim 19 wherein the filtering material comprises:
activated carbon.

30. The filtration matrix of claim 19 wherein the filtering material is selected from the group comprising:
activated carbon, heavy metal reduction media, arsenic removal media, antimicrobial media, ion exchange media, iodinated resin, fiber, acid gas adsorption media and particulate removal media.

31. The filtration matrix of claim 19 wherein the filtering material comprises:
activated carbon having an average particle size of about 20 to about 180 microns.

32. The filtration matrix of claim 19 wherein the filtering material comprises:
activated carbon wherein about 90% of the actual particle distribution ranges from less than 1 micron to about 45 microns.

* * * * *

UNITED STATES PATENT AND TRADEMARK OFFICE
CERTIFICATE OF CORRECTION

PATENT NO. : 7,112,280 B2
APPLICATION NO. : 10/216241
DATED : September 26, 2006
INVENTOR(S) : Douglass E. Hughes It is certified that error appears in the above-identified patent and that said Letters Patent is hereby corrected as shown below:

In the Figures:
  Fig 3 –
  The x-axis should read --Distribution density--;

Fig 4 –
  The x-axis should read --Distribution density--;

Column 11, line 43 (Table III) –
  Delete "110" and insert --10--;

Column 15, line 33 –
  Insert --Special Characteristics-- (new heading);
Column 15, line 34 –
  Delete "Special Characteristics" and insert --The aforementioned process of sintering chosen structural materials such as--;

Column 16, line 13 –
  Delete "CF-I" and insert --CF-1--;

Column 19, line 32 –
  Delete "trimethlpentane" and insert --trimethylpentane--;

Column 19, line 34 –
  Delete "trimethlpentane" and insert --trimethylpentane--;

Column 19, line 50 –
  Delete "trimethlpentane" and insert --trimethylpentane--;

Column 25, line 9 (Claim 1) –
  Delete "sperical" and insert --spherical--;

Column 25, line 16 (Claim 2) –
  Delete "comprising," and insert --comprising:--;
Column 25, line 21 (Claim 2) –
  Delete "shperical" and insert --spherical--;

UNITED STATES PATENT AND TRADEMARK OFFICE
CERTIFICATE OF CORRECTION

PATENT NO.        : 7,112,280 B2
APPLICATION NO.   : 10/216241
DATED             : September 26, 2006
INVENTOR(S)       : Douglass E. Hughes It is certified that error appears in the above-identified patent and that said Letters Patent is hereby corrected as shown below:

Column 27, line 25 (Claim 24) –
  Delete "comprise" and insert --comprise:--.

Signed and Sealed this

Ninth Day of January, 2007

JON W. DUDAS
*Director of the United States Patent and Trademark Office*